2,988,544
PIGMENT DYESTUFFS
Christoph Frey, Basel, Karl Ronco, Muttenz, and Max Schmid, Riehen, Switzerland, assignors to Ciba Limited, Basel, Switzerland
No Drawing. Filed Jan. 19, 1959, Ser. No. 787,364
Claims priority, application Switzerland Jan. 27, 1958
6 Claims. (Cl. 260—173)

This invention provides valuable new pigment dyestuffs of the formula

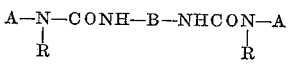

in which A represents the radical of an organic dyestuff, B represents an organic radical, and R represents a hydrogen atom or an alkyl group.

The invention also provides a process for the manufacture of the pigment dyestuffs of the above formula, wherein one molecular proportion of a diisocyanate is reacted with 2 molecular proportions of an organic dyestuff containing a reactive amino group, or one molecular proportion of an organic compound containing two reactive amino groups is reacted with approximately two molecular proportions of a dyestuff containing an isocyanate group.

As suitable organic dyestuffs there may be mentioned, for example, anthraquinone dyestuffs, but more especially, azo-dyestuffs, which contain a reactive amino group, that is to say, an amino group which contains at least one exchangeable hydrogen atom. Of special interest are dyestuffs which contain a primary amino group which may be bound directly to an aromatic nucleus of the dyestuff molecule or bound to the dyestuff molecule through a bridge member, for example, an alkylene group, an alkylene-amino group, an imino group, a —CO— or —SO$_2$— group such, for example, as a group of the formula —NH—CH$_2$CH$_2$NH$_2$, —NHNH$_2$, —CONH$_2$, —CONHNH$_2$ or —SO$_2$NH$_2$.

Among the azo-dyestuffs there may be mentioned, for example, disazo-dyestuffs and more especially monoazo-dyestuffs, for example, those of the benzene-azo-benzene, benzene-azo-pyrazolone or more especially of the benzene-azo-naphthalene series. There may be used metal-free azo-dyestuffs or complex metal compounds of azo-dyestuffs, for example, complex copper, nickel, chromium or cobalt compounds. Apart from the amino group defined above the monoazo-dyestuffs may contain further substituents of the kind usual in azo-dyestuffs and incapable of reacting with isocyanates or capable of reacting therewith considerably more slowly than the amino, for example, halogen atoms or alkyl, trifluoromethyl, hydroxyl, alkoxy, acylamino, arylamino, nitro, dialkylamino, carboxylic acid ester or cyano groups.

Among the anthraquinone dyestuffs there may be mentioned 1- and 2-aminoanthraquinone and substitution products thereof, for example, 1-amino-4- or -5-benzoylamino-anthraquinone, 1 - amino - 4-methoxyanthraquinone, 1-amino-4-phenyl-aminoanthraquinone or 4-aminoanthraquinone-1(N):2-acridone. There may also be used as starting materials azo-dyestuffs which contain an anthraquinone radical as the radical of the diazo component. Instead of amino groups the afore-said dyestuffs may contain an isocyanate group. Such dyestuffs are known (see, Publication Board Report No. 73,919 page 1585), and they can be obtained by reacting the appropriate amino-azo-dyestuffs with phosgene in an inert organic solvent.

Two molecular proportions of a dyestuff containing an amino group are reacted with approximately one molecular proportion of a diisocyanate. As diisocyanates there may be used those of the aliphatic or more especially the aromatic series, for example, hexamethylene diisocyanate, phenylene-1:4-diisocyanate,
2-nitrophenylene-1:4-diisocyanate,
1-methyl-phenylene-2:4-diisocyanate,
2:5-dichlorophenylene-1:4-diisocyanate,
2-methoxy-5-chlorophenylene-1:4-diisocyanate,
naphthylene-1:5-diisocyanate, diphenyl-4:4'-diisocyanate,
3:3'-dichloro-diphenyl-4:4'-diisocyanate,
3:3'-dimethyl-diphenyl-4:4'-diisocyanate,
3:3'-dimethoxy-diphenyl-4:4'diisocyanate,
di-(3-isocyanato-4-methylphenyl)-urea,
2:5-dimethoxy-phenylene-1:4-diisocyanate,
2-methoxy-5-methyl-phenylene-1:4-diisocyanate,
1:1'-azobenzene-4:4'-diisocyanate,
benzene-1:1'-azonaphthalene-4:4'-diisocyanate or anthraquinone-2:6-diisocyanate.

Two molecular proportions of a dyestuff containing an isocyanate group are reacted with 1 molecular proportion of a diamine. As suitable diamines there may be mentioned:

ethylene diamine, 1:4-diaminobenzene,
1:4-diamino-2:5-dimethoxybenzene,
1:4-diamino-2:5-dichlorobenzene,
1:5-diamino-naphthalene, 4:4'-diamino-diphenyl,
4:4'-diamino-3:3'-dichloro-diphenyl,
4:4'-diamino-3:3'-dimethyl-diphenyl,
4:4'-diamino-3:3'-dimethyl-diphenyl,
4:4'-diamino-3:3'-dimethoxy-diphenyl,
4:4'-diamino-1:1'-azobenzene,
4:4'-diamino-diphenyl-sulfone,
3:3'diamino-4:4'-dichloro-diphenylsulfone,
3:3'-diamino-4:4'-dimethoxy-diphenylsulfone,
3:3'-diaminodiphenyl ketone,
3:3-diamino-4:4'-dichloro-diphenyl ketone,
3:3'-diamino-4:4'-dimethoxy-diphenyl ketone,
3:3'-diamino-diphenylmethane,
3:3'-diamino-4:4'-dichloro-diphenylmethane,
4:4'-diamino-3:3'-dichloro-diphenylmethane, or
4:4'-diamino-3:5:3':5'-tetrachlorodiphenylmethane.

The reaction is advantageously carried out in the presence of an inert solvent, for example, chlorobenzene, ortho-dichlorobenzene, nitrobenzene or 1-chloronaphthalene, at a temperature within the range of 50° C. to 200° C., and advantageously 130° C. to 180° C. In view of the high reactivity of isocyanates it is of considerable advantage to carry out the reaction in the absence of water. In some cases it is also of advantage to carry out the condensation in the presence of a tertiary base, for example, pyridine.

The products of this invention probably correspond to the formula

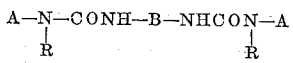

in which A represents the radical of an organic dyestuff, B an organic radical, and R a hydrogen atom or an alkyl group, and they are valuable pigment dyestuffs. The are excellently suitable, if desired, after being brought into a finely dispersed form, for dyeing organic products, for example, lacquers, plastic masses, especially polyvinyl chloride, or printing inks, or for spin dyeing artificial fibers, for example, viscose artificial silk. Conversion of the dyestuffs into a finely dispersed form and/or into an especially favorable modification can be carried out, for example, by grinding the dyestuff in the dry or aqueous moist condition in the presence of an organic water-soluble or water-insoluble solvent, or in a viscous medium in an apparatus having a kneading action with or without the addition of a solid assistant, for example, a salt capable of being washed out of the dyestuff. In many cases it is of advantage, in order to bring the dyestuff into a finely dispersed form, to grind the crude pigment with the substratum to be colored or with a component of the substratum. The colorations so obtained are distinguished by their good fastness to light and migration.

The following examples illustrate the invention, the parts and percentages being by weight unless otherwise stated, and the relationship of parts by weight to parts by volume being the same as that of the kilogram to the liter.

*Example 1*

47.25 parts of 1-amino-2-methoxy-5-chlorobenzene are stirred in 250 parts of water and 87 parts of hydrochloric acid of 30% strength, and the mixture is cooled with ice to 0° C. There are then added dropwise at 0–5° C., 75 parts by volume of a 4 N-solution of sodium nitrite. The diazo-solution is filtered, and then run at 5–10° C. into a filtered solution of 42.9 parts of 2-aminonaphthalene in 500 parts of water and 40 parts of hydrochloric acid of 30% strength, and the hydrochloric acid is neutralized by slowly adding dropwise a solution of 20% strength of sodium acetate. When the coupling is finished, the whole is filtered, and the filter residue is washed with water and dried.

12.5 parts of the dyestuff so obtained are introduced into 200 parts by volume of ortho-dichlorobenzene and the whole is heated to 110° C. At that temperature 4.2 parts of naphthalene-1:5-diisocyanate and 3 parts of pyridine are added. The whole is heated to 150–155° C. and stirred at that temperature for about 15 hours. The mixture is then allowed to cool to 100° C., and the pigment so formed is filtered off, washed with hot ortho-dichlorobenzene and then with hot alcohol, and dried in vacuo at 90° C. When the dyestuff is rolled into polyvinyl chloride a reddish yellow foil is obtained having good fastness to migration and light.

By using, instead of the naphthylene-1:5-diisocyanate, 3.4 parts of phenylene-1:4-diisocyanate there is obtained a pigment which, when rolled into polyvinyl chloride, yields a yellow-orange coloration having similar properties of fastness.

By using, instead of the naphthylene-1:5-diisocyanate, 4.2 parts of 2-nitrophenylene-1:4-diisocyanate, a pigment is obtained which yields an orange coloration when rolled into polyvinyl chloride.

In the following table are given in column IV the tints of the colorations produced in polyvinyl chloride with the dyestuffs obtained by coupling the diazo-components given in column I with the coupling components given in column II, and condensing the resulting amino-azo-dyestuffs with the di-isocyanates given in column III:

| | I<br>Diazo component | II<br>Coupling component | III<br>diisocyanate | IV<br>Coloration in polyvinyl chloride |
|---|---|---|---|---|
| 1 | 2:5-dichloraniline | 2-aminonaphthalene | 3:3′-dimethyldiphenyl-4:4′-diisocyanate | yellow orange. |
| 2 | 1-amino-2-nitro-4-chlorobenzene | do | phenylene-1:4-diisocyanate | brownish red. |
| 3 | 2:5-dichloraniline | 1-aminonaphthalene | do | brown. |
| 4 | do | do | 2-nitrophenylene-1:4-diisocyanate | yellowish brown. |
| 5 | 1-amino-2-methyl-4-nitrobenzene | 2-aminonaphthalene | 3:3′-dichlorodiphenyl-4:4′-diisocyanate | scarlet. |
| 6 | do | do | naphthylene-1:5-diisocyanate | Do. |
| 7 | 1-amino-2:5-dimethoxybenzene | do | 2:5-dichlorophenylene-1:4-diisocyanate | golden yellow. |
| 8 | 1-amino-2-methoxy-4-chloro-5-methyl-benzene. | do | 2-nitrophenylene-1:4-diisocyanate | orange yellow. |
| 9 | do | do | 1-methylphenylene-2:4-diisocyanate | brownish yellow. |
| 10 | do | 1-aminonaphthalene | 3:3′-dimethoxydiphenyl-4:4′-diisocyanate | yellow. |
| 11 | do | do | 1:1′-azobenzene-4:4′-diisocyanate | Do. |
| 12 | do | do | benzene-1:1′-azonaphthalene-4:4′-diisocyanate | Do. |
| 13 | 1-amino-2:5-dimethoxy-4-benzoyl-amino-benzene. | 2-aminonaphthalene | anthraquinone-2:6-diisocyanate | scarlet. |
| 14 | do | do | diphenyl-4:4′-diisocyanate | Do. |
| 15 | do | do | 2-methoxy-5-methyl-phenylene-1:4-diisocyanate | orange. |
| 16 | do | do | 1:1′-azobenzene-4:4′-diisocyanate | scarlet. |
| 17 | do | do | di-(3-isocyanato-4-methylphenyl)-urea | yellowish red. |
| 18 | 2-aminoanthraquinone | do | phenylene-1:4-diisocyanate | red. |
| 19 | 3-methoxy-4-aminoazobenzene | do | do | Do. |
| 20 | 1-amino-2-methoxy-5-chlorobenzene | do | 1-methylphenylene-2:4-diisocyanate | orange. |
| 21 | 1-aminobenzene-2-carboxylic acid methyl ester | do | naphthylene-1:5-diisocyanate | Do. |
| 22 | do | do | 1-methylphenylene-2:4-diisocyanate | Do. |
| 23 | 1-amino-2-methoxy-4-nitrobenzene | do | diphenylmethane-4:4′-diisocyanate | red. |
| 24 | 1-amino-2-methyl-5-chlorobenzene | 1-(4′-aminophenyl)-3-methylpyrazolone | naphthylene-1:5-diisocyanate | yellow. |
| 25 | 1-amino-2-methoxy-4-chloro-5-methylbenzene. | 2-hydroxy-3-naphthoic acid hydrazide | 2:5-dichlorophenylene-1:4-diisocyanate | bluish red. |
| 26 | 1-amino-3-methoxy-4-acetylamino-6-chlorobenzene. | β-naphthol; acetyl group eliminated | naphthylene-1:5-diisocyanate | red. |
| 27 | do | 1-(2′:3′-hydroxynaphthoylamino)-2-methoxybenzene; acetyl group eliminated. | 2:5-dichlorophenylene-1:4-diisocyanate | Do. |
| 28 | 1-amino-4-nitrobenzene | 1-(2′:3′-hydroxynaphthoylamino)-2-methoxybenzene; nitro group reduced. | 3:3′-dichlorodiphenyl-4:4′-diisocyanate | Do. |
| 29 | 1-amino-2:5-dimethoxy-4-benzoylaminobenzene. | 6-amino-2-hydroxy-3-naphthoyl-2′-methylaniline; coupled in an alkaline medium. | 2:5-dichlorophenylene-1:4-diisocyanate | blue. |
| 30 | 1-amino-4-methoxy anthraquinone | 1-amino-2-methoxy-5-methylbenzene | phenylene-1:4-diisocyanate | brownish olive. |

*Example 2*

12.5 parts of the dyestuff obtained as described in Example 1 from diazotized 1-amino-2-methoxy-5-chlorobenzene and 1-aminonaphthalene are heated with stirring in 200 parts by volume of ortho-dichlorobenzene at 100 to 110° C., 3.4 parts of hexamethylene diisocyanate are added, and the whole is heated for 3 hours at 150 to 155° C., then cooled to about 100° C., and the pigment is filtered off. Working up as described in Example 1 yields an orange-colored powder which when incorporated with polyvinyl chloride produces a yellow coloration of good fastness to migration and to light.

*Example 3*

58.65 parts of 1-amino-2-chloro-5-trifluoromethylbenzene are stirred into 250 parts of water and 260 parts of hydrochloric acid of 30% strength. The mixture is cooled to −5 to 0° C. with about 100 parts of ice, 75 parts by volume of 4 N-sodium nitrite solution are added dropwise within two to three minutes, and the mixture is stirred for half an hour. The diazo solution is filtered and at 5–10° C. run into a filtered solution of 42.9 parts of 2-aminonaphthalene in 500 parts of water and 40 parts of hydrochloric acid of 30% strength; the hydrochloric acid is neutralized by slow dropwise addition of sodium acetate solution of 20% strength. On completion of the coupling the reaction mixture is filtered, and the filter residue is washed with water and dried.

14.36 parts of this dyestuff in 150 parts by volume of ortho-dichlorobenzene are heated to 110° C. 5.9 parts of 3:3′-dimethoxydiphenyl-4:4′-diisocyanate and 4 parts of pyridine are added, the mixture is heated at 150–155° C. and stirred at this temperature for 15 hours, allowed to cool to 100° C.; the pigment is filtered off, washed with hot ortho-dichlorobenzene, then with hot alcohol and dried in vacuo at 90° C. On incorporation with polyvinyl chloride it produces a yellow-orange foil of good fastness to migration and to light.

When 3:3′-dimethoxydiphenyl-4:4′-diisocyanate is replaced by 4.6 parts of naphthylene-1:5-diisocyanate, a pigment is obtained which on incorporation with polyvinyl chloride produces a yellow-orange foil having identical fastness properties.

When 3:3′-dimethoxydiphenyl-4:4′-diisocyanate is replaced by 4.8 parts of 2:5-dichlorophenylene-1:4-diisocyanate, a pigment is obtained which on incorporation with polyvinyl chloride produces a yellow foil which likewise has very good fastness properties.

When in the first paragraph 1-aminonaphthalene instead of 2-aminonaphalene is used as coupling component, and 2:5-dichlorophenylene-1:4-diisocyanate is used as reactant, a pigment is obtained which produces an orange dyeing of excellent fastness to migration.

*Example 4*

13.03 parts of the aminoazo dye prepared as described in Example 1 from 1-amino-2-methoxy-4-chloro-5-methylbenzene and 2-aminonaphthalene are heated with stirring at 100–110° C. in 100 parts by volume of ortho-dichlorobenzene; the solution is mixed with a solution of 4.2 parts of naphthylene-1:5-diisocyanate in 50 parts by volume of ortho-dichlorobenzene, and condensation is performed for 15 hours at 150–155° C. The reaction mixture is cooled to 100° C., and the pigment is filtered off. Working up as described in Example 1 yields a yellow-orange powder which on incorporation with polyvinyl chloride produces a yellow dyeing of good fastness to migration and to light.

When naphthylene-1:5-diisocyanate is replaced by 3.2 parts of phenylene-1:4-diisocyanate, a pigment is obtained which on incorporation with polyvinyl chloride produces a yellow-orange foil having the same fastness properties.

When naphthylene-1:5-diisocyanate is replaced by 4.6 parts of 2:5-dichlorophenylene-1:4-diisocyanate, a yellow pigment is likewise obtained.

*Example 5*

13.03 parts of the monoazo dye prepared from 1-amino-2-methoxy-4-chloro-5-methylbenzene and 1-aminonaphthalene as described in Example 1 in 100 parts by volume of ortho-dichlorobenzene are mixed with stirring at 100° C. with a solution of 6.1 parts of 3:3′-dichlorodiphenyl-4:4′-diisocyanate in 50 parts by volume of ortho-dichlorobenzene. The mixture is stirred for 15 hours at 150–155° C., and the pigment is filtered off at 100° C. The usual working up gives an excellent yield of a yellow-brown powder which on incorporation with polyvinyl chloride produces brilliant yellow foils of good fastness to migration and to light.

When 3:3′-dichlorodiphenyl-4:4′-diisocyanate is replaced by 4.2 parts of naphthylene-1:5-diisocyanate, or by 3.2 parts of phenylene1:4-diisocyanate, or by 4.6 parts of 2:5-dichlorophenylene-1:4-diisocyanate, pigments are obtained which on incorporation with polyvinyl chloride likewise produce yellow foils of good fastness properties.

*Example 6*

8.53 parts of the monoazo-dyestuff prepared as described in Example 1 from 1-amino-4-benzoylamino-2:5-dimethoxybenzene and 2-aminonaphthalene are dissolved in 150 parts by volume of ortho-dichlorobenzene; at 110° C. a solution of 1.61 parts of phenylene-1:4-diisocyanate in 30 parts by volume of ortho-dichlorobenzene is added, and the mixture is stirred for 15 hours at 150–155° C. The red-brown pigment worked up as in Example 1 produces on incorporation with polyvinyl chloride a scarlet dyeing which is fast to migration and to light.

When 8.53 parts of the above-mentioned aminoazo dyestuff are condensed with 2.3 parts of 2-methoxy-5-chlorophenylene-1:4-diisocyanate, or with 2.3 parts of 2:5-dichlorophenylene-1:4-diisocyanate, red pigments are likewise obtained which have very good fastness properties.

*Example 7*

7.48 parts of the monoazo dyestuff prepared from 2-amino-4-chlorodiphenyl ether and 2-aminonaphthalene as described in Example 1, in 130 parts by volume of ortho-dichlorobenzene, are mixed at 110° C. with a solution of 2.3 parts of 2:5-dichlorophenylene-1:4-diisocyanate in 30 parts by volume of ortho-dichlorobenzene. The mixture is condensed for 15 hours as 150–155° C., the temperature is then allowed to drop to 100° C., and after working up as described in Example 1 a yellow-orange powder is obtained which on incorporation with polyvinyl chloride produces a yellow foil having good fastness to migration and to light.

When 2:5-dichlorophenylene-1:4-diisocyanate is replaced by 1.6 parts of phenylene-1:4-diisocyanate, a pigment is obtained which on incorporation with polyvinyl chloride produces orange-colored foils of identical fastness properties.

*Example 8*

42.45 parts of 2-methyl-5-chloro-1-aminobenzene are diazotized as described in Example 1. This filtered diazo solution is run into a solution of 56.1 parts of 2:3-hydroxynaphthoic acid amide, 46.5 parts of sodium hydroxide solution of 30% strength and 60 parts of crystalline sodium acetate in 700 parts of water. On completion of the coupling the dyestuff is filtered off, washed with water and dried.

13.6 parts of this dyestuff in 200 parts by volume of ortho-dichlorobenzene are heated at 120–130° C. 6.2 parts of 3:3′-dichlorodiphenyl-4:4′-diisocyanate are added, the mixture is heated to 150–160° C. and stirred at this temperature for 15 hours, allowed to cool to 100° C., and the pigment is filtered off, washed with hot ortho-dichlorobenzene, with hot dimethyl formamide and then with hot alcohol. On incorporation with polyvinyl chloride it produces a bluish red dyeing of good fastness to migration and to light.

When 3:3′-dichlorodiphenyl-4:4′-diisocyanate is replaced by phenylene-1:4-diisocyanate, a pigment is obtained which on incorporation with polyvinyl chloride produces red foils of good fastness to migration and to light.

*Example 9*

14.8 parts of the dyestuff prepared from diazotized 1-amino-2-methoxy-4-chloro-5-methylbenzene and 2:3-hydroxynaphthoic acid amide as described in Example 8, in 200 parts by volume of trichlorobenzene are mixed at 120–130° C. with 3.3 parts of phenylene-1:4-diisocyanate. The mixture is stirred for 15 hours at 150–155° C., allowed to cool, and the pigment is filtered off and worked up as described in Example 8.

On incorporation with polyvinyl chloride this dyestuff produces a brownish-red foil having good fastness to migration and to light.

When phenylene-1:4-diisocyanate is replaced by 4.2 parts of naphthylene-1:5-diisocyanate, polyvinyl chloride foils of a similar tint and identical fastness properties are obtained.

*Example 10*

A solution of 5.25 parts of 2:3'-dimethyl-1:1'-azobenzene-4'-isocyanate in 100 parts of ortho-dichlorobenzene is mixed with a solution of 1.1 parts of para-phenylenediamine in 30 parts of ortho-dichlorobenzene; the mixture is heated for 15 hours at 150–155° C., cooled to about 100° C. and the pigment formed is filtered off. Working up as described in Example 1 yields a yellow powder which on incorporation with polyvinyl chloride produces a yellow dyeing of good fastness properties.

*Example 11*

2.75 parts of benzene-1:1'-azonaphthalene-4'-isocyanate, obtained by reacting the dyestuff from diazotized aminobenzene and 1-aminonaphthalene with phosgene, are stirred for 7 hours at 140–150° C. with 0.82 part of benzidine and 1 part of pyridine in 50 parts by volume of ortho-dichlorobenzene. After cooling, the mixture is filtered, and the resulting pigment is washed with hot ortho-dichlorobenzene and alcohol. On incorporation with polyvinyl chloride it produces a brown foil having good fastness to migration.

*Example 12*

35.9 parts of 1-amino-2-methoxy-4-chloro-5-methylbenzene are stirred into 400 parts of water and 52 parts of hydrochloric acid of 30% strength and cooled with ice to 0° C. 52 parts of 4 N-sodium nitrite solution are added dropwise at 0–5° C. The filtered diazo solution is run at 5–10° C. into a filtered solution of 30 parts of 2-aminonaphthalene in 500 parts of water and 22 parts of hydrochloric acid of 30% strength, and the hydrochloric acid is neutralized by slowly adding dropwise a sodium acetate solution of 20% strength. On completion of the coupling the mixture is filtered, the residue is washed with water and the water is removed azeotropically in 500 parts of ortho-dichlorobenzene. At the same time 50 parts of phosgene are introduced into 300 parts of ortho-dichlorobenzene at 20–0° C., the solution is cooled to −15° and at −15 to 0° C. a hot solution of 19.5 parts of 2:5-dichloro-para-phenylenediamine in 100 parts of ortho-dichlorobenzene is added. While raising the whole slowly to 130° C., 50 parts of phosgene are introduced; nitrogen is introduced into the solution for 1 hour at 120–130° C., to expel any excess phosgene, the solution is cooled to 50° C. and a small amount of insoluble matter is filtered off. The resulting solution of 2:5-dichlorophenylene-1:4-diisocyanate is added to the dehydrated dyestuff solution, and condensation is performed for 15 hours at 150–155° C. The pigment obtained by working up as described in Example 1 produces on incorporation with polyvinyl chloride a yellow dyeing which is fast to migration and to light.

*Example 13*

65 parts of polyvinyl chloride, 35 parts of dioctylphthalate and 0.2 part of the dyestuff obtained as described in the second paragraph of Example 1 are stirred together and then rolled to and fro for 7 minutes at 150° C. on a two-roller calender. A reddish-yellow foil results which has good properties of fastness to migration and to light.

*Example 14*

A mixture of 40 parts of a nitrocellulose lacquer containing 25% of solids, 2.375 parts of titanium dioxide and 0.25 part of the dyestuff described in the third paragraph of Example 4 is ground for 16 hours in a rod mill. An aluminum foil is brushed with a thin coat of the lacquer obtained in this manner. A yellow lacquer coat is obtained which has good fastness to light and to over-lacquering.

*Example 15*

0.25 part of the dyestuff described in the first paragraph of Example 7, together with 40 parts of an alkyd-melamine stoving varnish containing 50% of solids and 4.75 parts of titanium dioxide are ground for 24 hours in a rod mill. An aluminum foil is brushed with a thin coat of the resulting varnish and stoved for one hour at 120° C. The resulting yellow varnish coat has good fastness to light.

*Example 16*

4.8 parts of the dyestuff described in the second paragraph of Example 1 are mixed with 4.8 parts of dinaphthylmethane-disulfonic-acid and 22.1 parts of water and ground in a ball mill until all dyestuff particles have been reduced to a size of less than 1μ. The resulting pigment suspension contains about 15% of pigment.

When this aqueous suspension is added to a viscose rayon spinning solution and the latter is then spun by the conventional spinning method, a reddish-yellow cellulose filament is obtained which has good fastness properties.

What is claimed is:
1. A pigment dyestuff of the formula

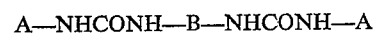

in which A represents the radical of a monoazo dyestuff selected from the group consisting of the anthraquinone-azo-benzene, the benzene-azo-pyrazolone and the benzene-azo-naphthalene series, the benzene, pyrazolone and naphthalene moiety, respectively, of A, being linked to the urea bridge member in the above formula, and B an arylene radical, the nuclear portion of which is selected from the group consisting of one carbocyclic six-membered ring, two non-condensed carbocyclic six-membered rings, two condensed carbocyclic six-membered rings, and three carbocyclic six-membered rings at least two of which are condensed with each other, the part of B connecting uncondensed ring portions being a member selected from the group consisting of a saturated bond, methylene, —N=N—, —NH—CO—NH—, both A and B being free from groups imparting solubility in water.

2. A pigment dyestuff of the formula

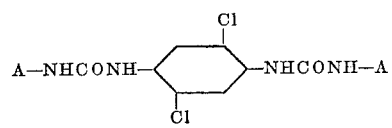

in which A represents the radical of a monoazo dyestuff of the benzene-azo-naphthalene series, which radical is free from groups imparting solubility in water.

3. The pigment dyestuff of the formula
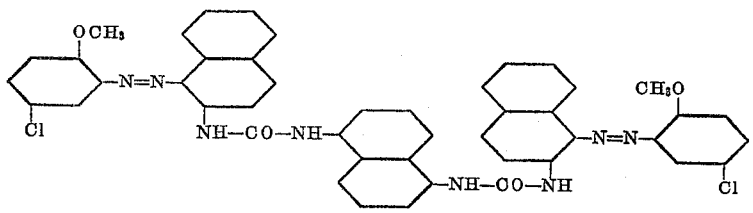
4. The pigment dyestuff of the formula
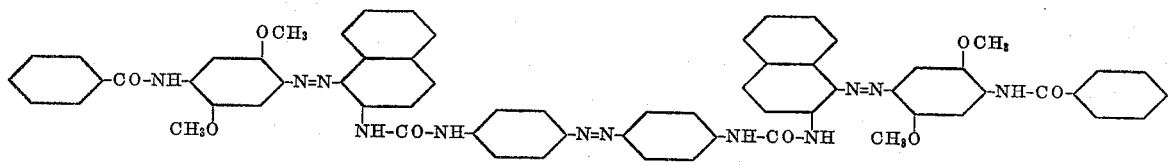
5. The pigment dyestuff of the formula
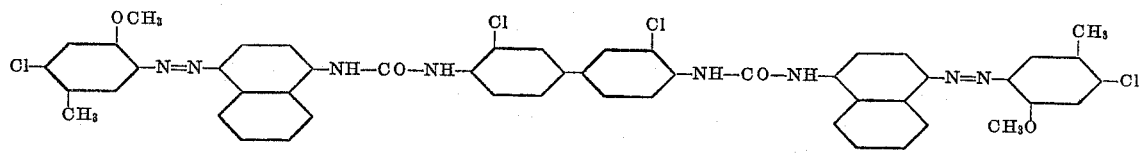
6. The pigment dyestuff of the formula
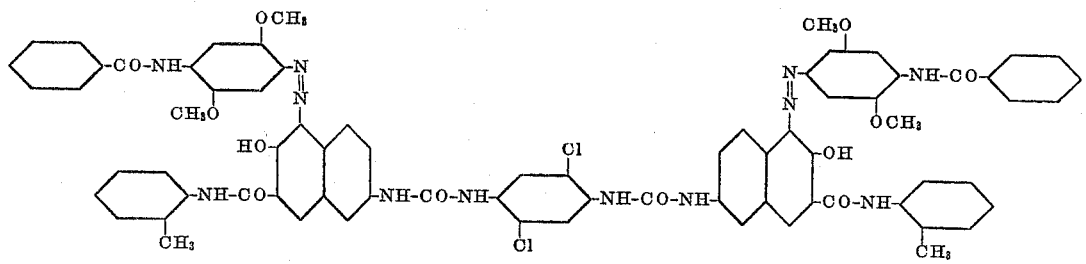
References Cited in the file of this patent
UNITED STATES PATENTS
| | | |
|---|---|---|
| 1,006,929 | Freimann | Oct. 24, 1911 |
| 2,518,023 | Keller et al. | Aug. 8, 1950 |
| 2,768,159 | Bossard et al. | Oct. 23, 1956 |
| 2,870,172 | Schoenauer | Jan. 20, 1959 |
FOREIGN PATENTS
| | | |
|---|---|---|
| 248,858 | Great Britain | Mar. 16, 1926 |
| 266,102 | Switzerland | Apr. 17, 1950 |